ASSOCIATIVE SUPERCONDUCTIVE LAYER STORER
Filed April 20, 1967
Fig.1
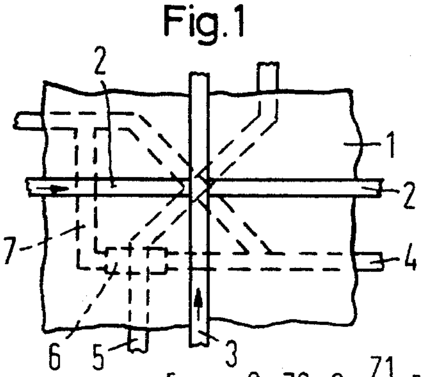
Fig.3
| | Z1 | Z2 | |
|---|---|---|---|
| "1" | + | − | W |
| | + | + | B |
| "0" | − | + | W |
| | − | − | B |
Fig.2
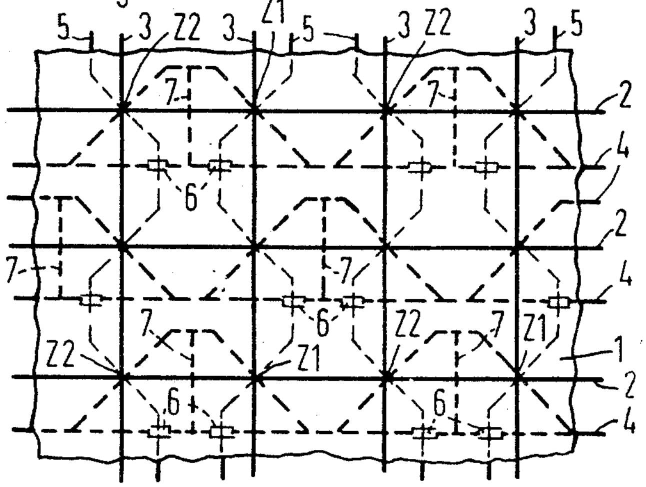
Fig.4
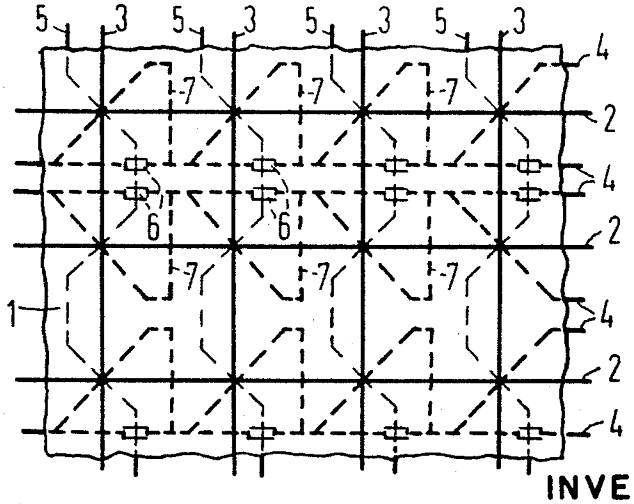
INVENTORS
Karl Goser
Hans-Günther Kadereit
BY
Stiee & Stiee
ATTYS.

United States Patent Office 3,460,102

Patented Aug. 5, 1969

3,460,102
ASSOCIATIVE SUPERCONDUCTIVE LAYER STORER

Karl Goser, Munich, and Hans-Gunther Kadereit, Munich-Solln, Germany, assignors to Siemens Aktiengesellschaft, a corporation of Germany Filed Apr. 20, 1967, Ser. No. 632,411
Claims priority, application Germany, Apr. 22, 1966, S 103,339
Int. Cl. G11b *9/02*
U.S. Cl. 340—173.1 9 Claims

ABSTRACT OF THE DISCLOSURE

A superconductive storer which is associatively organized whereby the presence of information and its location in the storer is determined by association, employing a superconductive layer and cooperable drive or insertion lines and sensing lines, for example, word and bit drive lines and interrogation and recognition sensing lines, which lines likewise may be superconductive, and including cyrotrons in certain lines.

The invention relates to a superconductive storer which is organized associatively. In previous storers fixed positions or addresses are required for the stored information. The program must then contain detailed particulars, which can be effected successively. For example, "Go to storage place No. 1342, read the information, bring it to . . . etc." Basing considerations on the realization that the human brain when thinking about and answering questions, whose replies were previously received at some time or other, also needs no addresses, in order to find the result, the associatively organized storer was developed, which could have a great future as a "more intelligent" storer. For example, a certain word is interrogated by introducing it (perhaps initially with only a few letters) and through comparison with the stored data it is established if and where it is in the storer.

The present invention has as its objective the development of a particularly advantageous type of such an associative storer which, in particular, consists of only superconductive components utilizing thin layers, which possesses the advantage of a low noise level, as well as a saving in energy and space.

Details of the invention will be apparent from the following description of the mode of operation of a structure embodying these features, as well as from the exemplified embodiments illustrated in the drawings and accompanying explanations.

In the drawings, in which like reference characters indicate like or corresponding parts:

FIG. 1 schematically illustrates a single cell which comprises a portion of the matrix arrangement of FIG. 2;

FIG. 2 is a schematic diagram illustrating a matrix arrangement embodying the invention;

FIG. 3 is a chart illustrating polarity conditions for respective storage states; and FIG. 4 is a figure similar to FIG. 2, illustrating a further embodiment of the invention.

In accordance with the invention, the following features are proposed for an associative superconductive layer storer in which, as illustrated in FIG. 1, over a superconductive layer 1 a network of preferably superconductive cross members is disposed, certain lines of which may extend perpendicularly to one another, and comprise drive lines in the form of word lines 2 and bit lines 3 which are inductively separated by the layer 1 from cooperable sensing means.

Such sensing means includes a so-called word recognition line 4, which extends below the crossing points of the drive lines 2 and 3, in a diagonal direction with respect to the network of drive lines. Connected in parallel with these lines are superconductive cross members, which in each case contain a croytron 6. Along each bit line 3 an additional superconductive cross member is provided in the form of a so-called interrogation line 5, which also extends below the crossing parts of the drive lines 2 and 3 in the other diagonal direction of the particular network, and thus perpendicularly to the section of the word recognition line 4 the interrogation line 5 also simultaneously serving as the control line for the cryotron.

In the following explanations positive direction of current in the word line 2 may be defined from left to right, and in the bit line 3, as well as on the interrogation line 5, from bottom to top, as indicated by the arrows in FIG. 1.

At the crossing points of respective drive lines a magnetic flow (field of a permanent current in the layer 1) is effected in known manner, which is always in the direction of the associated diagonal section of the word recognition line 5 and represents the binary units "1" and "0," in dependence upon the two different operational possibilities. The flow for a "1" may be directed from lower right to upper left, which is attained through positive pulses on both drive lines. The inversely directed flow which represents a "0" is then effected through simultaneous negative impulses on the bit line and the word line. If a positive impulse is now applied to the interrogation line, this produces at the point of the diagonal section of the word recognition line 4 a field which is directed oppositely to that of a stored "1." If the magnitude of this interrogation impulse is so adjusted that these two fields correspond in magnitude, a field of zero exists on the part of the word recognition line being considered, i.e. the diagonal cross member of the word recognition line is superconductive ("1" interrogated). With a negative interrogation current the two fields are correspondingly directed and interconnect the diagonal cross member in the normal conductive position, assuming that through suitable choice of the superconductive material of the word recogntion line, care is taken that its critical magnetic field is smaller than such total field, consequently, if the word recognition line 4 remains superconductive with positive impulses on the interrogation line 5 (resistaince "zero"), a "1" is stored in the cell involved, and if it remains superconductive with negative interrogation currents, the cell involved possesses the information state "0." The cryotron 6 in the branching cross member 7 is, in the interrogation, always blocked by "0" (negative interrogation current) as well as by "1" (positive interrogation current), so that actually only the superconductive condition of the diagonal portion of the word recognition line is decisive. For example, if a certain word is sought, e.g. 1001011, on the interrogation lines the pulses (+−−+−++) are simultaneously given and only the word recognition line 4 below the word line 2 remains fully conductive, along which the word involved stands, there is thereby indicated first, that the word sought is present in the storer and, second, the location thereof. The parallel branches 7 may be utilized when a word is not fully interrogated, for example, in a form of preselection in which all "words" with the same combination of the first $n$ digits can be searched for wherein $n<N$=number of digits of a word. Falsifications of the result which occur due to fluctuations of the cell parameter, in cells not directly under consideration are avoided, as the field of information alone already has blocked the diagonal cross members of the word recognition line, whereby the latter below the non-interrogated cells is bridged with conductive cryotrons through the corresponding cross members 7.

When constructing the storer matrix of FIG. 2, care should be taken, due to the fact that along an entire interrogation line an interrogation pulse (positive, for example) should recognize a "1" and thus should produce a field directed in the opposite direction, that the position of "0" and "1" in the two differently arranged individual cell types also be different, whereby the two individual cell types differ through interchanged positions of the diagonal cross members of the word recognition line, as well as of the interrogation line.

FIG. 3, in the form of a table, indicates the polarities of a word current W and a bit current B, which register the information "1" or "0," as the case may be (the cell according to FIG. 1 being designated $Z_1$, and the inverted cell as $Z_2$).

It will be noted that the storer must be coincidentally controlled in relation to the registration of the information, which, however, involves no problems. The storer matrix also can be constructed in accordance with the embodiment of FIG. 4, in which the cell types $Z_1$ or $Z_2$ are alike along a word line and only differ from word line to word line.

The cryotrons 6 can be realized in a particularly advantageous form by producing parts of the bridging cross members 7 of a super-conductive material with such small value of the critical field strength that they are connected in normal conductive condition through the magnetic field of the interrogation current on the interrogation line 5 passing through such parts.

The necessary insulation of the component parts with respect to each other can be attained through evaporization of insulating interlayers, for example of $SiO_2$ (as in the case of previously proposed superconductive layer storers) which have been eliminated in the figures.

Changes may be made within the scope and spirit of the appended claims which define what is believed to be new and desired to have protected by Letters Patent.

We claim:

1. An associative superconductive layer storer, comprising a superconductive layer, a network of cross members disposed at one side of said layer, certain of which extend perpendicularly to other of such members, forming word and bit drive lines, by means of which information may be inserted in the storer at the crossing points of such drive lines, and a network of cross members disposed at the opposite side of and inductively separated from said drive lines by said layer, forming so-called recognition lines and interrogation lines, the recognition lines extending in the same general storer direction as the word lines, and the interrogation lines extending in the same general storer direction as the bit lines, each recognition line crossing drive line crossing points cooperable therewith diagonally with respect to such drive lines, and each interrogation line crossing drive line crossing points cooperable therewith in the other diagonal direction whereby said interrogation and recognition lines extend perpendicularly to each other at such crossing points, a plurality of members each connected in parallel with a respective diagonally extending portion of the recognition lines at the respective drive line crossing points, each of said parallely extending members having a cryotron inserted therein, each cryotron being operatively disposed with respect to a corresponding interrogation line whereby the latter simultaneously serves as a control line therefor.

2. An associative superconductive layer storer according to claim 1, wherein the word recognition line consists of a superconductor having, at operating temperature of the storer, such a small critical field strength that its total value in the same direction of the magnetic fields of stored information and interrogation current is sufficient to connect the specific section of the word recognition line in the normal conductive position.

3. An associative superconductive layer storer according to claim 1, wherein the cryotrons are constructed as superconductive parts of the parallelly extending members, and have such small values of the critical field strength that they are connected in the normal conductive condition through the magnetic field of the interrogation current on the interrogation line involved.

4. An associative superconductive layer storer according to claim 1, wherein the value of the current on the interrogation lines is so large that it produces, at the location of said diagonally extending portions of the word recognition line, a magnetic field that corresponds in magnitude to that of the field of the stored information.

5. An associative superconductive layer storer according to claim 2, wherein the cryotrons are constructed as superconductive parts of the parallelly extending members, and have such small values of the critical field strength that they are connected in the normal conductive condition through the magnetic field of the interrogation current on the interrogation line involved.

6. An associative superconductive layer storer according to claim 2, wherein the value of the current on the interrogation lines is so large that it produces, at the location of said diagonally extending portions of the word recognition line, a magnetic field that corresponds in magnitude to that of the field of the stored information.

7. An associative superconductive layer storer according to claim 3, wherein the value of the current on the interrogation lines is so large that it produces, at the location of said diagonally extending portions of the word recognition line, a magnetic field that corresponds in magnitude to that of the field of the stored information.

8. An associative superconductive layer storer according to claim 1, wherein the directions of said diagonal portions of the respective recognition lines alternate along the associated word line, and directions of diagonal portions of recognition lines associated with a common bit line likewise alternate along such bit line.

9. An associative superconductive layer storer according to claim 1, wherein the directions of said diagonal portions of the respective recognition lines are alike for each respective word line, and alternate in direction from word line to word line.

References Cited

UNITED STATES PATENTS

| | | | |
|---|---|---|---|
| 2,958,848 | 11/1960 | Garwin | 340—173.1 X |
| 3,164,808 | 1/1965 | Rogers et al. | 340—173.1 |
| 3,172,086 | 3/1965 | Wendt | 340—173.1 |
| 3,311,898 | 3/1967 | Bremer et al. | 340—173.1 |
| 3,354,441 | 11/1967 | Gange | 340—173.1 |

BERNARD KONICK, Primary Examiner

J. F. BREIMAYER, Assistant Examiner